July 27, 1943.     M. A. BERNS     2,325,031
CORING KNIFE
Filed Feb. 9, 1942
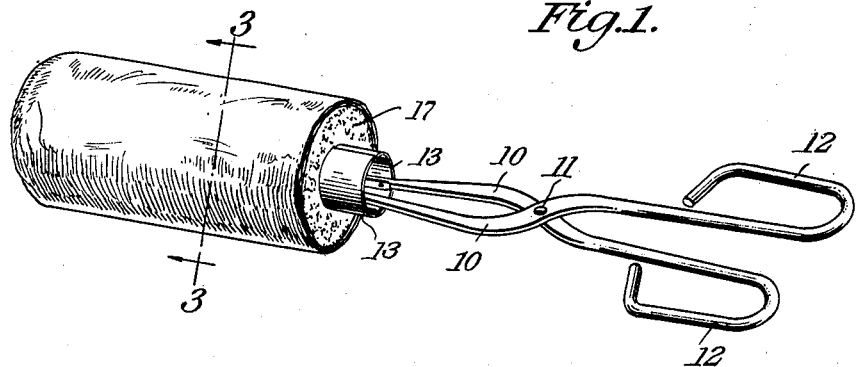
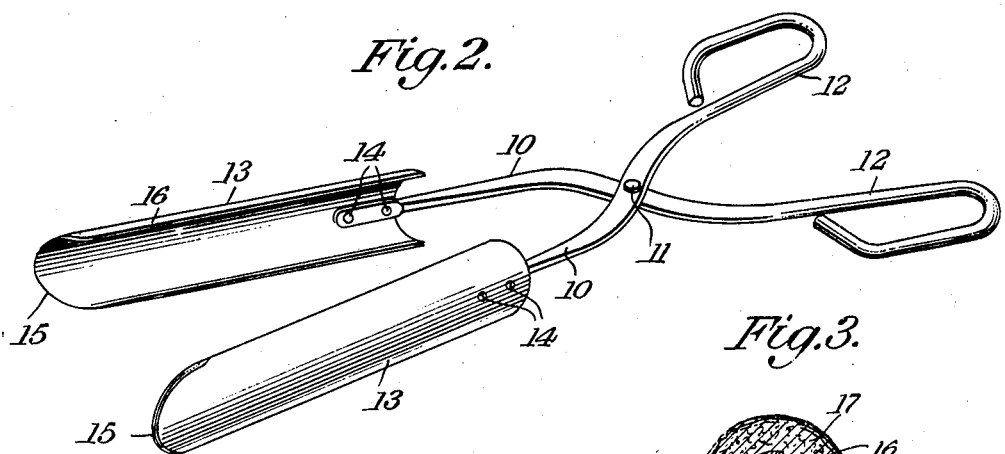
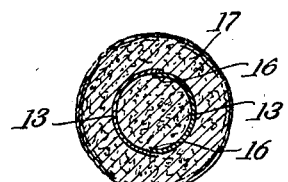
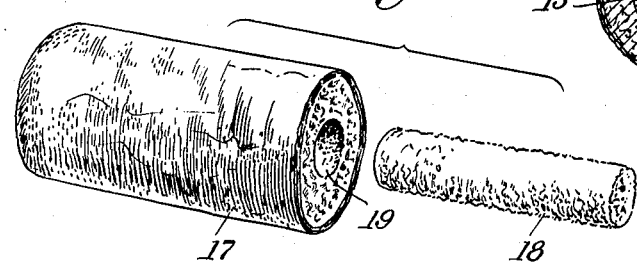
INVENTOR.
Morris A. Berns
BY
Victor J. Evans & Co.
ATTORNEYS Patented July 27, 1943

2,325,031

UNITED STATES PATENT OFFICE 2,325,031

CORING KNIFE

Morris A. Berns, Chicago, Ill.

Application February 9, 1942, Serial No. 430,135

2 Claims. (Cl. 30—174)

This invention relates to a coring knife and has for an object to provide a coring knife particularly adapted to core a bread roll to permit the insertion of a frankfurter in the roll.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a perspective view of a coring knife constructed in accordance with the invention in applied position to core a bread roll.

Figure 2 is a perspective view of the coring knife shown in Figure 1.

Figure 3 is a cross sectional view taken on the line 3—3 of Figure 2.

Figure 4 is a perspective view showing the opening in the roll when the core of the roll is removed by the tool.

Referring now to the drawing in which like characters of reference designate similar parts in the various views, 10 designates a pair of crossed levers pivotally connected together as shown at 11 at their crossing end each terminating at one end in a closed loop grip 12 adapted to receive the thumb and fingers of the operator's hand to spread apart and move together the opposite ends of the levers.

On the opposite side of the pivot from the grip each lever is equipped with a semicylindrical blade 13, preferably secured to the lever by rivets 14 or other connectors. The free end of each blade is rounded and sharpened as shown at 15. Moreover one of the blades is provided with flat longitudinal edge portions 16, see Figure 3, which cause the blade to interfit with the other blade when the blades are closed to form substantially a cylinder open at the front and at the rear ends.

In the operation of the device the thumb is inserted in one grip and the fingers in the other grip and the grips brought close together to bring the blades into closed interfitting position. Thereupon the blades are thrust forward until their sharpened leading ends 15 penetrate the end of a cylindrical bread roll 17 whereupon the tool is thrust longitudinally into the roll for almost the entire length of the roll to sever a cylindrical core. Upon withdrawal of the tool the core 18 is extracted by the blades from the roll leaving a cylindrical opening 19, see Figure 4, to receive a frankfurter or other filling to form a sandwich.

Upon extraction of the tool from the roll the blades 13 are opened to any desired extent to permit the tool again being applied to expand the size of the cylindrical opening to any required size to permit a frankfurter or other filling to be inserted in the roll.

It will be pointed out that the flattened longitudinal edges 16 of one of the blades when overlapped upon the longitudinal edges of the other blade exert spring action on said other blade to cause sufficient frictional engagement between the blades to maintain the blades closed.

From the above description it is thought that the construction and operation of the invention will be fully understood without further explanation.

What is claimed is:

1. A coring knife comprising crossed levers pivotally connected together at their crossing end terminating at one end in finger loops, and blades of semicylindrical cross section on the free ends of the levers adapted to interfit along their longitudinal edge portions when closed to form a cylinder open at both ends, the leading ends of the blades being sharpened and rounded to facilitate entry of the blades into a bread roll for coring the roll to receive a filling.

2. The structure as of claim 1 and in which the longitudinal edge portions of one blade are flattened to interfit with the longitudinal edge portions of the other blade with spring action when the blades are closed to maintain the blades closed.

MORRIS A. BERNS.